(12) United States Patent
Aulin et al.

(10) Patent No.: US 11,002,359 B2
(45) Date of Patent: May 11, 2021

(54) HYBRID DRIVE MODULE WITH CHAIN DRIVE

(71) Applicant: BorgWarner Sweden AB, Landskrona (SE)

(72) Inventors: Hans Aulin, Malmö (SE); Robin Gustafsson, Lund (SE); Tim Olsson, Ödåkra (SE); Bradley Duane Chamberlin, Pendelton, IN (US); Rupert Tull De Salis, Heidelberg (DE)

( * ) Notice: Subject to any disclaimer, the term of this patent is extended or adjusted under 35 U.S.C. 154(b) by 471 days.

(21) Appl. No.: 15/753,473

(22) PCT Filed: Aug. 31, 2016

(86) PCT No.: PCT/EP2016/070477
§ 371 (c)(1),
(2) Date: Feb. 19, 2018

(87) PCT Pub. No.: WO2017/037096
PCT Pub. Date: Mar. 9, 2017

(65) Prior Publication Data
US 2018/0238439 A1    Aug. 23, 2018

(30) Foreign Application Priority Data

Aug. 31, 2015  (SE) .................................. 1551125-6

(51) Int. Cl.
*B60K 6/42* (2007.10)
*F16H 61/04* (2006.01)
(Continued)

(52) U.S. Cl.
CPC .......... *F16H 61/0403* (2013.01); *B60K 6/26* (2013.01); *B60K 6/365* (2013.01); *B60K 6/387* (2013.01); *B60K 6/405* (2013.01); *B60K 6/485* (2013.01); *B60K 6/547* (2013.01); *B60K 11/02* (2013.01); *B60W 10/06* (2013.01); *B60W 10/08* (2013.01);
(Continued)

(58) Field of Classification Search
CPC .. F16H 61/0403; F16H 57/0454; F16H 57/05; F16H 3/54; B60K 6/387; B60K 6/405; B60K 6/26; B60K 6/365; B60K 6/547; B60K 6/485; B60K 11/02; B60K 2006/268; B60W 10/06; B60W 10/08;
(Continued)

(56) References Cited

U.S. PATENT DOCUMENTS

| 1,984,148 A | 12/1934 | Morrish et al. |
| 4,693,133 A * | 9/1987 | Tomita ................ F16H 57/0006 184/6.12 |

(Continued)

FOREIGN PATENT DOCUMENTS

| CN | 103221720 A | 7/2013 |
| CN | 104411529 A | 3/2015 |

(Continued)

*Primary Examiner* — James M Dolak

(57) ABSTRACT

A hybrid drive module, comprising a housing (170) enclosing a chain drive (120) connecting an electrical motor (110) with a crank shaft (22) of an associated internal combustion engine (20) via at least one coupling (130, 140). Said housing (170) further comprises a reservoir (190) having an inlet (212) configured to receive oil from the chain (126) during operation, and an outlet (214, 214') arranged to distribute oil back to the chain (126).

15 Claims, 7 Drawing Sheets

(51) Int. Cl.
*B60K 6/485* (2007.10)
*B60K 6/387* (2007.10)
*B60K 6/405* (2007.10)
*F16H 57/04* (2010.01)
*F16H 57/05* (2006.01)
*B60K 6/26* (2007.10)
*B60K 6/365* (2007.10)
*B60K 6/547* (2007.10)
*B60K 11/02* (2006.01)
*B60W 10/06* (2006.01)
*B60W 10/08* (2006.01)
*B60W 10/115* (2012.01)
*B60W 20/40* (2016.01)
*F16H 3/54* (2006.01)
*B60K 6/48* (2007.10)

(52) U.S. Cl.
CPC .......... *B60W 10/115* (2013.01); *B60W 20/40* (2013.01); *F16H 3/54* (2013.01); *F16H 57/0454* (2013.01); *F16H 57/05* (2013.01); *B60K 2006/268* (2013.01); *B60K 2006/4841* (2013.01); *B60W 2510/0638* (2013.01); *B60W 2510/081* (2013.01); *B60W 2710/0644* (2013.01); *B60W 2710/081* (2013.01); *B60W 2710/1005* (2013.01); *B60Y 2200/92* (2013.01); *F16H 2061/0422* (2013.01); *F16H 2200/0034* (2013.01); *F16H 2200/2005* (2013.01); *F16H 2200/2064* (2013.01); *F16H 2200/2094* (2013.01); *Y10S 903/91* (2013.01); *Y10S 903/919* (2013.01); *Y10S 903/93* (2013.01); *Y10S 903/945* (2013.01)

(58) Field of Classification Search
CPC .............. B60W 10/115; B60W 20/40; B60W 2510/0638; B60W 2510/081
See application file for complete search history.

(56) References Cited

U.S. PATENT DOCUMENTS

| | | | | |
|---|---|---|---|---|
| 5,088,346 | A * | 2/1992 | Hirabayashi | B60K 5/04 475/206 |
| 5,875,691 | A * | 3/1999 | Hata | B60K 6/365 475/5 |
| 6,155,364 | A * | 12/2000 | Nagano | B60K 6/365 180/65.235 |
| 7,845,444 | B2 * | 12/2010 | Kidokoro | B60T 7/042 180/65.235 |
| 7,882,819 | B2 * | 2/2011 | Koyama | F01M 1/08 123/192.1 |
| 8,297,251 | B2 * | 10/2012 | Asaya | F01M 1/12 123/196 A |
| 8,496,812 | B2 * | 7/2013 | Beer | F01M 11/0004 210/167.03 |
| 8,602,940 | B2 * | 12/2013 | Kuwahara | B60K 23/02 477/86 |
| 8,863,618 | B2 * | 10/2014 | Kubo | B60K 6/48 74/661 |
| 9,046,166 | B2 * | 6/2015 | Neumeister | F16H 57/0409 |
| 9,676,267 | B2 * | 6/2017 | Hirose | B60K 6/48 |
| 9,789,923 | B2 * | 10/2017 | Hanawa | B60K 6/48 |
| 10,017,044 | B2 * | 7/2018 | Lahr | F16H 7/1281 |
| 10,272,906 | B2 * | 4/2019 | Ohashi | B60W 20/30 |
| 10,451,175 | B2 * | 10/2019 | Mishima | F16H 57/04 |
| 10,457,266 | B2 * | 10/2019 | Kodama | F16H 61/684 |
| 2010/0038296 | A1 | 2/2010 | Beer et al. | |
| 2010/0224149 | A1 | 9/2010 | Hirschmann et al. | |
| 2013/0190114 | A1 | 7/2013 | Neumeister | |

FOREIGN PATENT DOCUMENTS

| | | |
|---|---|---|
| DE | 102006022573 A1 | 12/2006 |
| JP | S60234173 A | 11/1985 |

* cited by examiner

HYBRID DRIVE MODULE WITH CHAIN DRIVE

This application claims the benefit of Swedish Application No. 1551125-6 filed Aug. 31, 2015, and PCT Application No. EP2016/070477 filed Aug. 31, 2016.

TECHNICAL FIELD

The present invention relates to a hybrid drive module and aspects of lubricating such hybrid drive module.

BACKGROUND

Hybrid powertrains for passenger cars are gaining interest and various solutions for such applications have been proposed during the recent years. Especially it has been suggested to provide the hybrid functionality as a separate module which is added to the existing powertrain. One example of an existing hybrid drive module includes a first sprocket which is intended to be connected to the crank shaft of the internal combustion engine indirectly via a dual mass flywheel and a disconnect clutch, and an electrical motor, preferably a 48V electrical motor, being drivingly connected to a second sprocket. The sprockets are connected by means of a belt, thus forming a belt drive, in order to allow for various driving modes such as pure electrical driving, recuperation, traction mode, and boost. In this prior art system the electrical motor, the flywheel, the clutch, and the belt drive are formed as a standalone module which can be added to an existing powertrain.

While the moving components of the hybrid drive module, i.e. the dual mass flywheel and the clutch need to be lubricated it is important to arrange the belt drive in a dry environment. For this reason it is not only required to provide a lubrication system for the moving parts, but also the housing of the hybrid drive module must be designed as separate sealed compartments in order to avoid oil leakage from the flywheel/clutch compartment to the belt drive compartment. Hence complex packing of the entire hybrid drive module is required.

In view of this it would be desired to provide a hybrid drive module having a reduced number of required components, as well as reduced complexity in terms of packing.

SUMMARY

It is thus an object of the teachings herein to provide an improved hybrid drive module overcoming the disadvantages of prior art solutions.

According to a first aspect, a hybrid drive module is provided. The hybrid drive module comprises a housing enclosing a chain drive connecting an electrical motor with a crank shaft of an associated internal combustion engine via at least one coupling. The housing further comprises a reservoir having an inlet configured to receive oil from the chain during operation, and an outlet arranged to distribute oil back to the chain.

In an embodiment the outlet is configured to distribute oil back to the chain when the oil level inside the reservoir reaches the vertical position of the outlet.

In one embodiment the reservoir is arranged adjacent to a first sprocket of the chain drive and the first sprocket is driven directly by the electrical motor.

The reservoir inlet may be arranged at an upper end of said first sprocket.

In one embodiment the reservoir outlet is arranged vertically below the reservoir inlet.

The reservoir outlet may be arranged at a vertical position at which the chain engages with the first sprocket.

The hybrid drive module in one embodiment may further comprise an additional oil passage having an ejector inlet receiving oil from the chain during operation, an oil channel connecting the oil passage downstream the ejector inlet with the reservoir, and an ejector outlet arranged to distribute oil back to the chain, whereby the additional oil passage forms an ejector for drawing oil from the reservoir to the chain.

The additional oil passage may further comprise a convergent-divergent nozzle arranged between the ejector inlet and the ejector outlet.

In one embodiment the reservoir of the hybrid drive module is provided with a magnet.

In an embodiment the at least one coupling of the hybrid drive module comprises a dual mass flywheel and/or a disconnect clutch.

The hybrid drive module may further comprise a launch clutch arranged in series with a second sprocket of the chain drive. The second sprocket is directly connected with said at least one coupling.

In one embodiment the hybrid drive module comprises a cassette configured to close the housing.

In an embodiment the cassette is provided with at least one oil port extending from an exterior side of said cassette to an interior side of said cassette.

In an embodiment the oil port of the cassette extends to a position at which the chain engages with the first sprocket.

The hybrid drive module may further comprise an oil pump configured to supply oil to said oil port of said cassette.

In a second aspect an engine assembly is provided. The engine assembly comprises an internal combustion engine and a hybrid drive module according to any one of the disclosed embodiments. The housing of the hybrid drive module is formed by an end section of an engine block of said internal combustion engine and an ear structure extending out from said end section.

In a third aspect a hybrid vehicle, comprising an engine assembly according to the second aspect is provided.

BRIEF DESCRIPTION OF THE DRAWINGS

Embodiments of the teachings herein will be described in further detail in the following with reference to the accompanying drawings which illustrate non-limiting examples on how the embodiments can be reduced into practice and in which.

DETAILED DESCRIPTION

Figure 1:
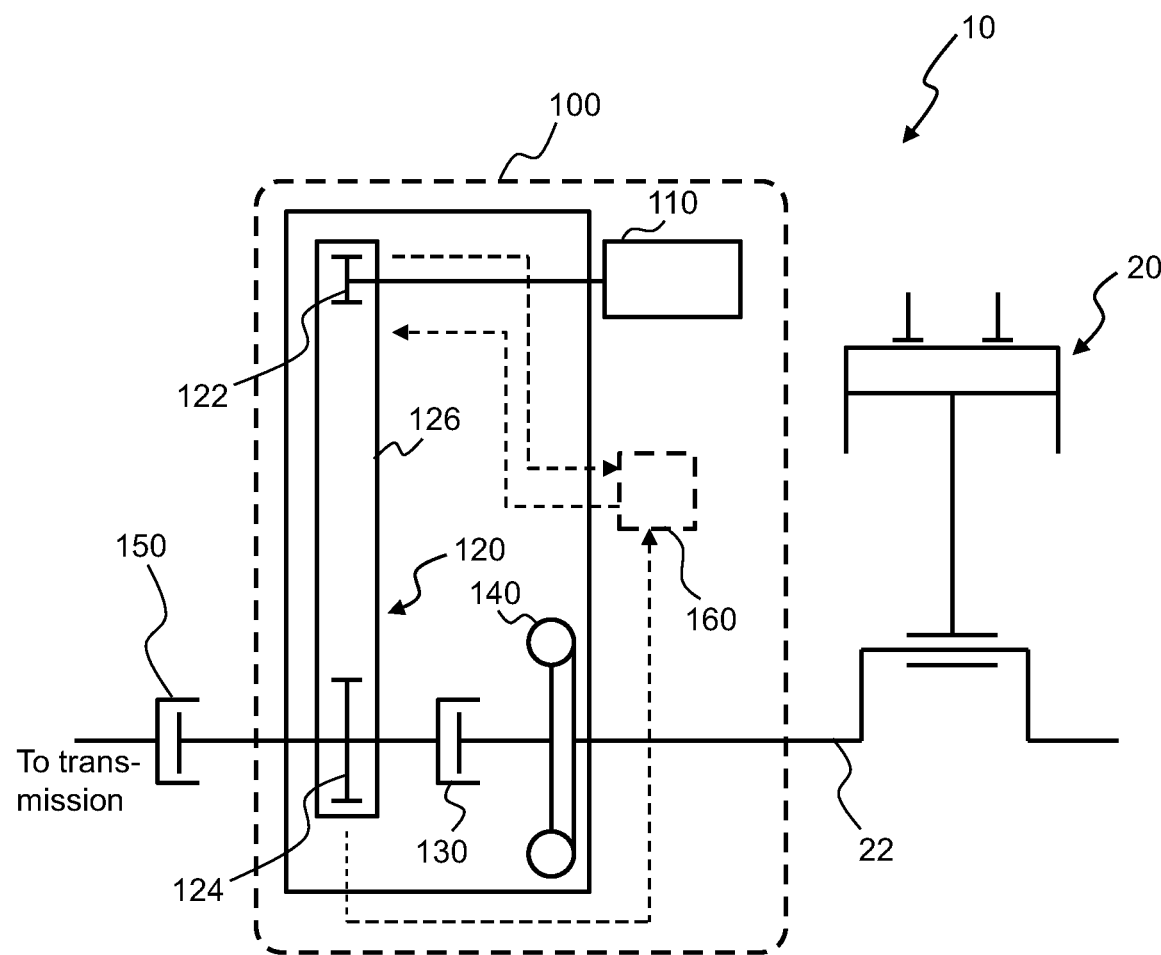
FIG. 1 shows a schematic outline of a hybrid drive module according to an embodiment.

Starting in FIG. 1 a schematic layout of an engine assembly 10 of a vehicle is shown. The vehicle is typically a passenger car, and the engine assembly comprises an internal combustion engine 20 and a hybrid drive module 100 according to an embodiment. As will be explained in the following the hybrid drive module 100 is mechanically connected to a crankshaft 22 of the internal combustion engine 20 in order to provide additional drive torque to a transmission (not shown) arranged in series with the hybrid drive module 100. Hence, the transmission is also connected to the crank shaft 22 as is evident from FIG. 1.

The hybrid drive module 100 comprises an electrical motor 110 and a chain drive 120 connecting the electrical motor 110 with the crank shaft 22. The electrical motor 110 is for this purpose driving a first sprocket 122 of the chain drive 120, whereby upon activation of the electrical motor 110 rotational movement of the first sprocket 122 is transmitted to a second sprocket 124 of the chain drive 120 via a chain 126.

The second sprocket 124 is drivingly connected to the crank shaft 22 via one or more couplings. In the embodiment shown in FIG. 1, the second sprocket 124 is connected to the output of a disconnect clutch 130 receiving driving torque from a dual mass flywheel 140. For parallel two-clutch systems, commonly denoted hybrid P2 systems, the disconnect clutch 130 is often referred to as the C0 clutch. The dual mass flywheel 140, which could be replaced by another torsional damping/absorption device, receives input torque directly from the crank shaft 22. However, for the purpose of the present embodiments either the disconnect clutch 130 and/or the dual mass flywheel 140 (or its substitute) could be omitted or replaced by another suitable coupling.

Also illustrated in FIG. 1 is a further optional clutch 150, here representing a launch clutch. Again referring to P2 systems, the launch clutch is often referred to as the C1 clutch. The launch clutch 150 is arranged downstream, i.e. on the output side of the hybrid drive module 100 upstream the transmission. It should be realized that the launch clutch 150 could be replaced by a torque converter or similar.

The electrical motor 110 is preferably a 48V motor/alternator which thus can be used to provide hybrid functionality to the existing powertrain of the vehicle. For other embodiments, also possible within the scope of this application, high voltage hybrid electrical motors may be utilized. More specifically, the provision of the chain drive 120 allows for modularity with high voltage hybrid electrical motors in comparison to if a belt drive would be used. A belt drive could never accommodate the much higher loads provided by a more powerful high voltage hybrid electrical motor.

The entire hybrid drive module 100 also comprises a lubrication system which according to the various embodiments presented herein is based on principle that the chain 126 will assist in circulating lubrication oil to the rotating parts of the hybrid drive module 100, i.e. the one or more couplings 130, 140. It should further be noted that in case of also utilizing a launch clutch or torque converter 150, this component could also be arranged within the hybrid drive module 100 thus taking benefit from the same lubrication system.

In some embodiments the lubrication system could be supported by an oil pump 160.

Lubrication oil should within the context of this disclosure be interpreted broadly to cover any automatic transmission fluid, engine oil, or other type of lubricating and cooling fluid suitable for the particular application.

Figure 2:
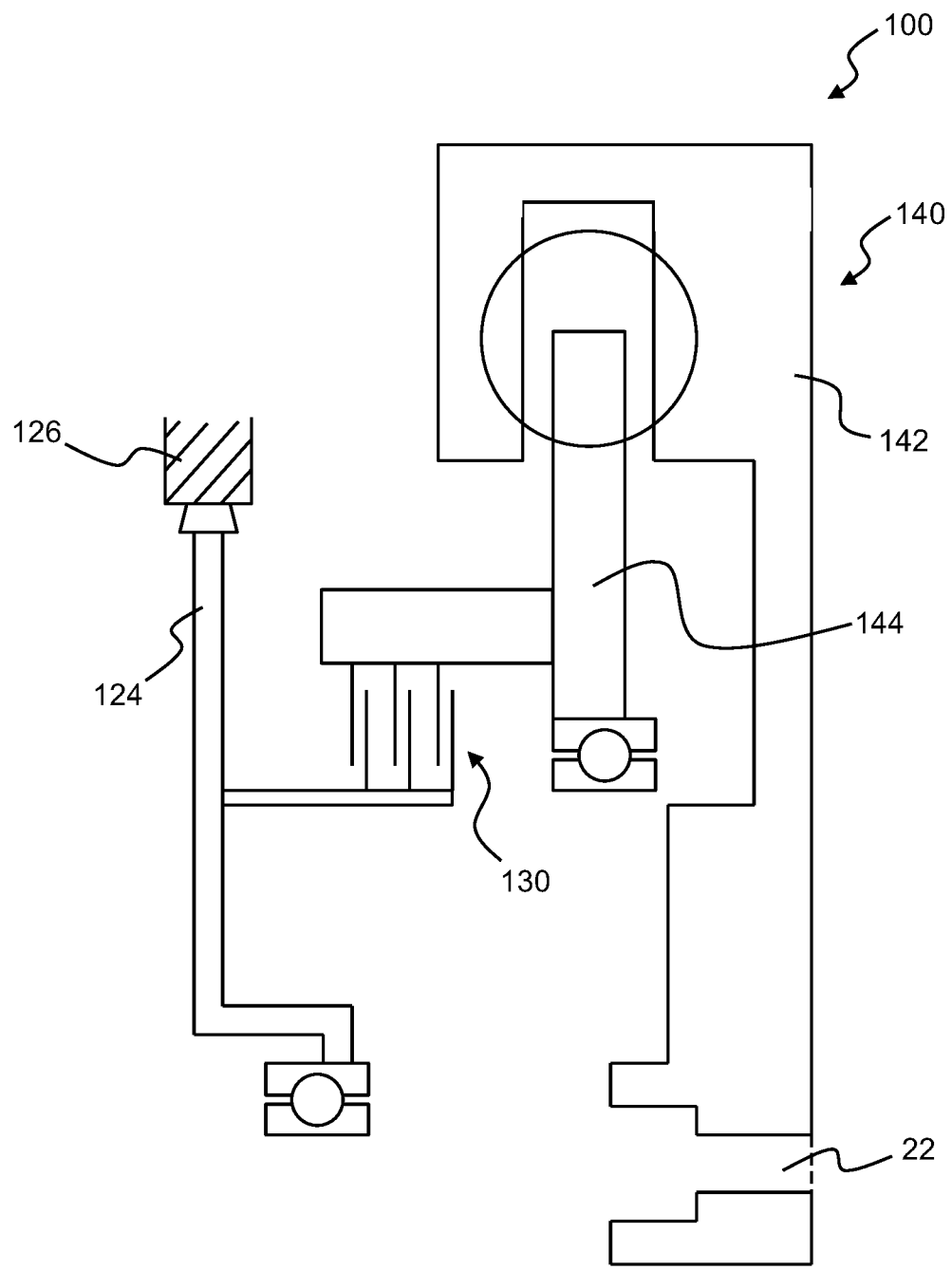
FIG. 2 is a cross-sectional view of parts of a hybrid drive module according to an embodiment.

One major advantage of the proposed solution is the small amount of package space required. Now turning to FIG. 2 a cross-section of parts of the hybrid drive module 100 are shown, illustrating the compactness of the hybrid drive module 100.

The crank shaft 22 provides input torque to a primary inertial mass 142 of the dual mass flywheel 140. A secondary inertial mass 144 of the dual mass flywheel 140 is in turn connected to an input side of the disconnect clutch 130, here in the form of a limited slip coupling. The output side of the disconnect clutch 130 is connected to the second sprocket 124 carrying the chain 126. Preferably, one or more springs may be provided connecting the internal masses 142, 144 to each other such that the secondary inertial mass 144 may rotate relative the primary inertial mass 142 whereby the springs may deform causing a reduction of torsional vibrations being transmitted from the internal combustion engine 20.

The dual mass flywheel 140 and the disconnect clutch 130 are arranged concentrically around the crank shaft 22, thereby reducing the axial length of the hybrid drive module 100.

Figure 3:
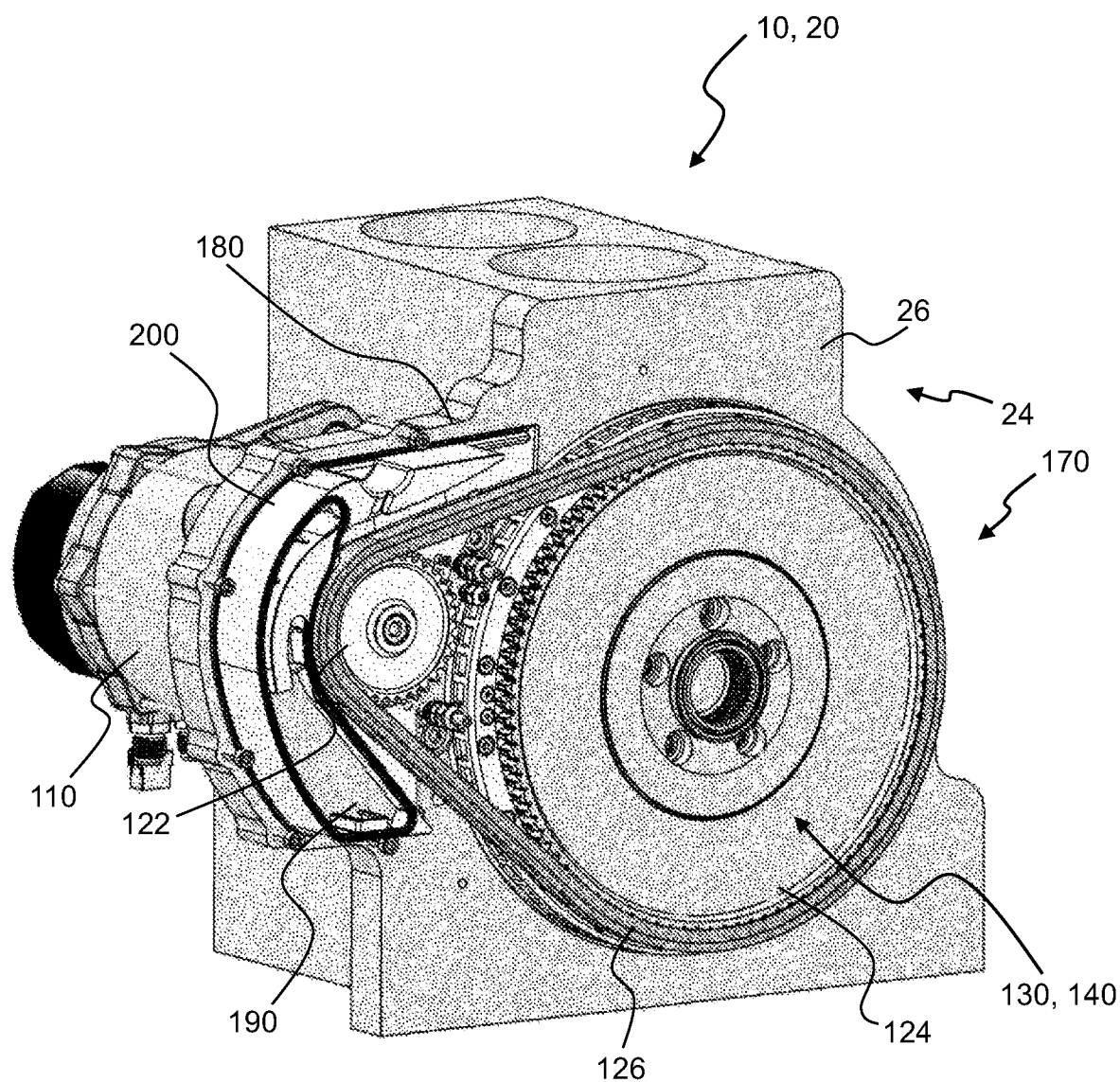
FIG. 3 is a an isometric view of parts of a hybrid drive module according to an embodiment.

In FIG. 3 the engine assembly 10 is again shown. As can be seen the hybrid drive module 100 is enclosed in a housing 170. The housing 170 is formed by an end section 24 of an engine block 26 of the internal combustion engine 20, an ear structure 180 attached to the end section 24 and extending outwards from the engine block 26, and a cassette (see FIG. 5) sealing the housing 170. The ear structure 180 is provided to allow space for the electrical motor 110 and the first sprocket 122 of the chain assembly 120, while the dual mass flywheel 140, the disconnect clutch 130, and the second sprocket 124 are dimensioned to fit within a circular area within the end section 24.

The housing 170 forms a reservoir 190 by means of an insert 200 arranged within the ear structure 180, optionally extending into the circular area within the end section 24. The reservoir 190 is arranged to contain oil during operation, and to provide lubrication to the chain 126 during operation.

The provision of the reservoir 190 allows for a completely passive lubrication system, meaning that no external oil pumps or channels are required to provide sufficient lubrication to the rotating parts of the hybrid drive module 100. More specifically, during operation the chain 126 will throw oil at the upper end of the first sprocket 122, so that the oil will flow into the reservoir 190. When the oil level inside the reservoir reaches a certain height an outlet provided in the reservoir 190 will allow for oil to exit the reservoir 190 at a position where the chain 126 meets the first sprocket 122. By such configuration the chain 126 will be lubricated by its own motion.

The amount of oil which is not transported to the reservoir will eventually fall downwards to the bottom of the housing 170. Since the ear structure 180 is arranged at a vertical position slightly above the lowermost point of the circular area of the end section 26, the oil will end up in the lowermost region of the circular area where the second sprocket 124, the dual mass flywheel 140, the chain 126, and the disconnect clutch rotates. Hence, these rotating parts 124, 126, 130, 140, especially the primary inertial mass 142 of the dual mass flywheel 140, will pick up the oil and propel it around its perimeter. Optionally, the same oil may be passed through a circuit to the rotating parts for improved cooling and lubrication. Such circuit may e.g. include a heat exchanger for removing excessive heat from various components in the hybrid drive module 100.

Eventually, this oil will again flow into the reservoir 190. For this purpose the inlet of the reservoir 190 is dimensioned to receive oil primary from the chain, but also from the other rotating parts 130, 140.

A magnet 216 is preferably arranged at the bottom of the reservoir 190 in order to attract any metal particles contained within the oil. Optionally the magnet 216 may be replaced by or in combination with a filter or other suitable means for cleaning the lubrication fluid during operation.

Figure 4A:
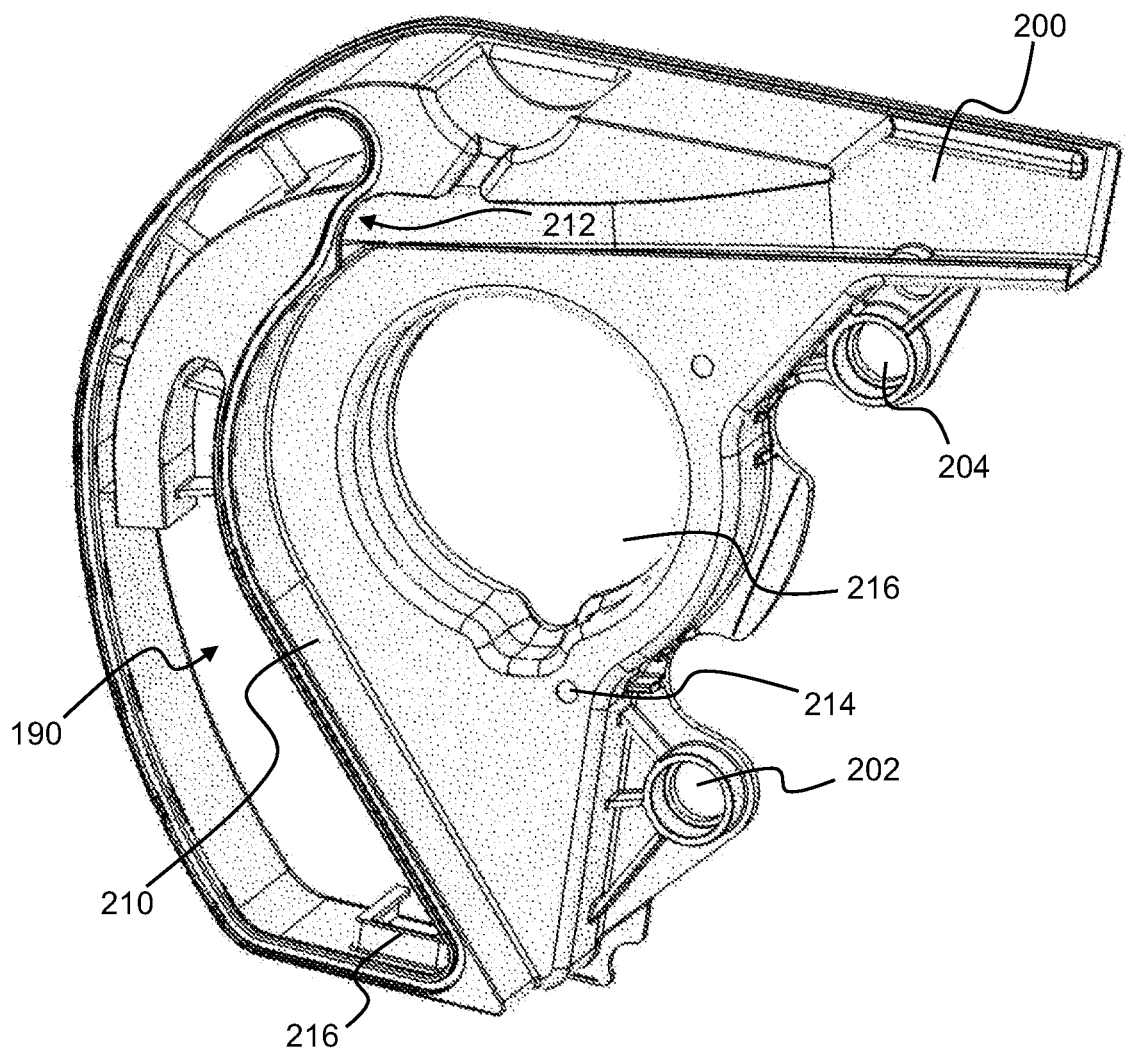
FIG. 4A is an isometric view of an insert forming an oil reservoir of a hybrid module according to an embodiment.
Figure 4B:
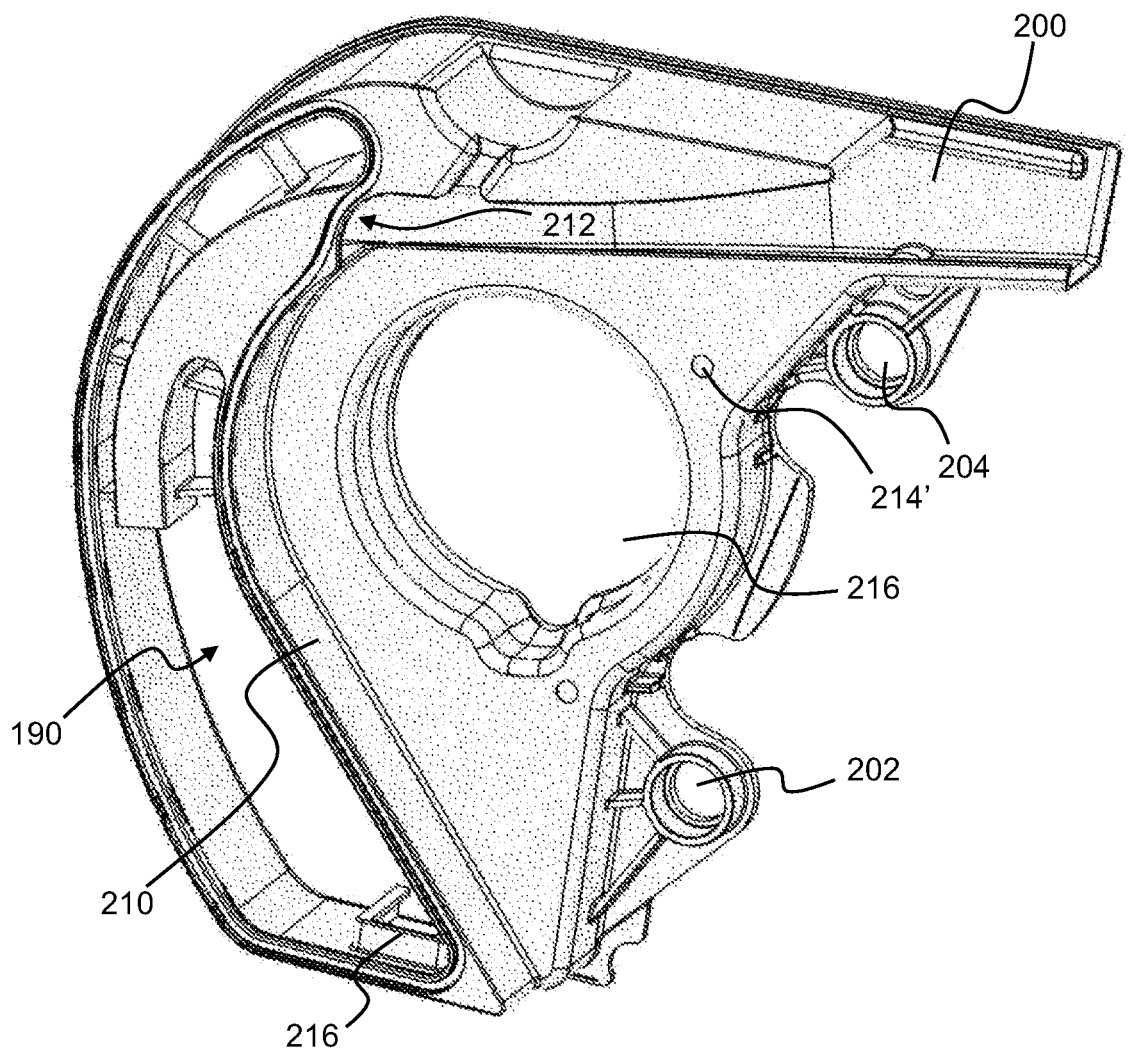
FIG. 4B is an isometric view of an insert forming an oil reservoir of a hybrid module according to an embodiment.

The insert 200 is further shown in FIG. 4. The insert 200 comprises through holes 202, 204 for securely attaching the insert to the ear structure 190 so that the insert 200 forms part of the housing 170. The insert 200 further comprises a cut-out portion 206 for receiving and guiding the rotational shaft of the electrical motor 110. The cut-out portion 206 is sealed against the ear structure 180 such that the reservoir 190 extends also around the cut-out portion 206.

An outer part of the insert 200, i.e. a part being opposite the side of the ear structure 180 connecting with the engine block 26, forms an axial projection 210 having approximately the same axial length as the width of the chain 126. The chain 126, being guided by the sprocket 122, may thus run close to the inner perimeter of the axial projection 210. The axial projection 210 includes a recess 190' defining the reservoir 190. At the upper end of the recess 190' a passage is provided which forms an oil inlet 212 for the reservoir 190. The reservoir 190, which is thus provided around and behind the first sprocket 122, has a vertical extension so that the oil will be transported downwards into the reservoir 190 after entering the inlet 212.

At a certain height of the reservoir 190 an oil outlet 214 is provided. The oil outlet 214 is preferably one or more holes in the sidewall of the axial projection 210 of the insert 200. As long as the oil level inside the reservoir 190 is above the oil outlet 214 oil will be allowed to exit the reservoir 190 and meet with chain 126 at a position where the chain 126 meets with the first sprocket 122. The amount of oil being poured onto the first sprocket 122 is thus dependent on the oil inflow and the dimensions of the oil outlet 214.

In another embodiment the outlet 214' (also indicated in FIG. 4) is arranged on the insert 200 at a position adjacent to the cut-out portion 206 so that oil exiting the outlet 214' will hit one or more teeth of the sprocket 122. Preferably, the outlet 214' is formed as an axially extending cone as illustrated in FIG. 4.

In order to improve lubrication it may be possible to increase the flow of the oil exiting the reservoir 190. For example, the oil inlet 212 may be designed such that the pressure inside the reservoir 190 builds up as the oil is flung from the chain 126 with high velocity. Such positive gauge pressure inside the reservoir 190 may be used to move the oil to other parts of the hybrid drive module 100.

Another option for increasing the oil flow out from the reservoir 190 is to make use of an ejector system. In such embodiment an additional oil passage is provided. The additional oil passage has an ejector inlet receiving oil from the chain 126 during operation, an oil channel connecting the oil passage downstream the ejector inlet with the reservoir 190, and an ejector outlet arranged to distribute oil back to the chain 126. A convergent-divergent nozzle is preferably arranged between the ejector inlet and the ejector outlet in order to provide suction drawing oil from the reservoir 190 to the chain 126.

Figure 5:
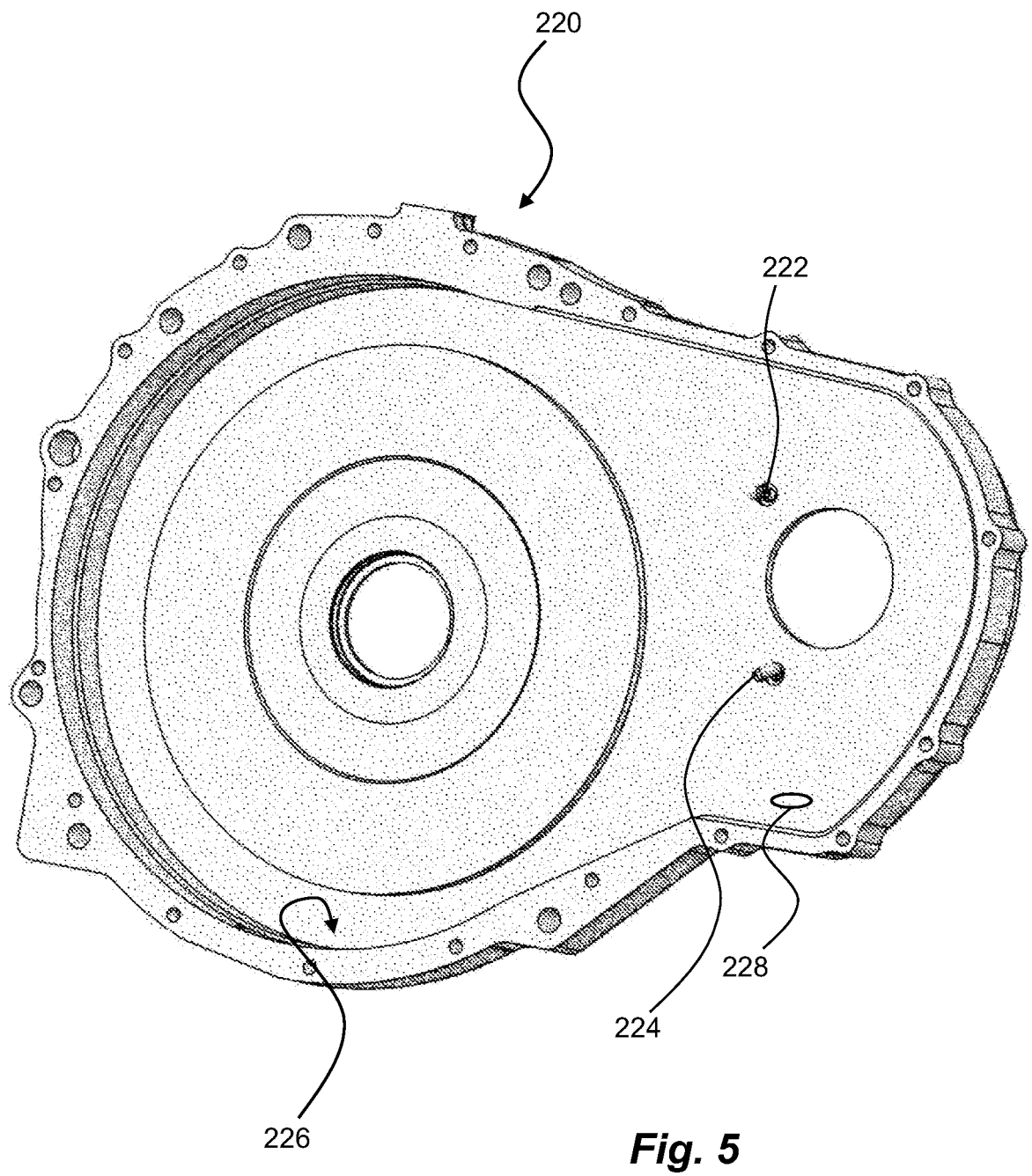
FIG. 5 is an isometric view of a cassette for closing the housing of a hybrid drive module according to an embodiment.

Now turning to FIG. 5 a cassette 220 is shown. The cassette 220 forms a closure for the housing 170 and the cassette 220 is thus dimensioned to fit with the entire housing 170, i.e. the end section 24 of the engine block 26 and the ear structure 180 attached thereto. The purpose of the cassette 220 is consequently to provide a sealed closure for the hybrid drive assembly 100.

In an embodiment, briefly discussed above with reference to FIG. 1, the hybrid drive module 100 may be provided with an additional lubrication system utilizing a separate oil pump 160. For such embodiment the cassette 220 may be provided with one or more oil ports 222, 224 being accessible from outside the cassette 220. Hence, the oil ports 222, 224 extends from the outside of the cassette 220 to the interior of the housing 170. In the shown example the external pump is connected to the upper oil port 222 for drawing oil from the chain 126 at a position where the chain 126 leaves the sprocket 122. The oil pump is further connected to the lower oil port 224 for delivering oil to the chain 126 at a position where the chain 126 meets with the sprocket 122. However, in other embodiments the external pump is connected to the reservoir 190 and/or the bottom of the housing 170 for drawing oil, whereby the oil is pumped to be delivered to the chain drive 120 via one or more of the ports 222, 224. Oil ports 226, 228 may preferably be provided for this purpose.

The embodiments presented above all share the same technical concept of utilizing a passive lubrication system for an entire hybrid drive module 100 using a chain drive 120 and a reservoir 190 by which lubrication oil may be circulated within the hybrid drive module 100.

Figure 6:
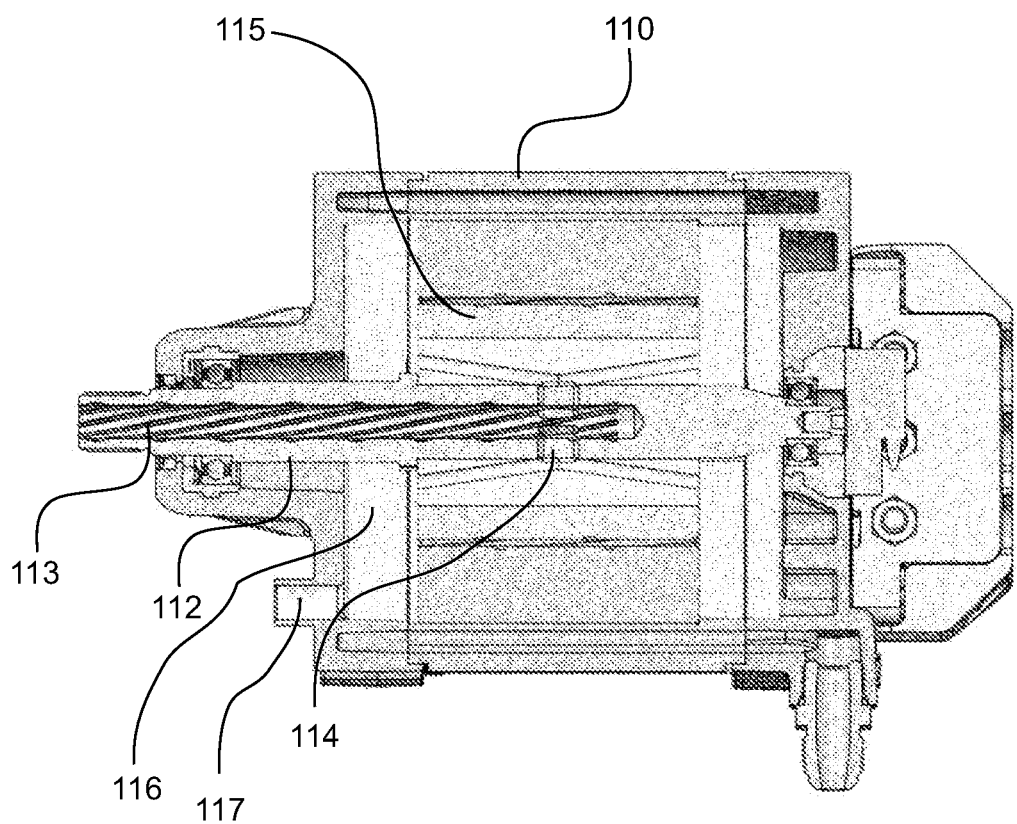
FIG. 6 is a cross-sectional view of parts of an electrical motor for use with a hybrid drive module according to an embodiment.

In FIG. 6 an embodiment of the electrical motor 110 is shown. In this example the electrical motor 110 is configured not only to receive oil from the reservoir 190 for cooling and lubrication of the electrical motor 110, but also to act as a pump in combination with the chain drive 120 for the entire lubrication system of the hybrid drive module 100.

In particular, the rotational shaft 112 of the electrical motor 110 is provided with an axial inlet for receiving oil from the reservoir 190. A passageway 113 inside the rotational shaft 112 transports the oil until it reaches one or more radial drillings 114, where the oil exits and hits the rotor assembly 115. The passageway may preferably be provided with striations or grooves for improving a pumping effect of the oil inside the passageway 113. As the rotor assembly is rotating, it will pull oil out of the shaft 112, pass it across the rotor assembly 115, and fling oil onto the end turns 116. The coolant oil could optionally pass onto a heat exchanger used for the electronics to extract heat.

With the outlet holes 117 on the rotor assembly 115 at a radial distance from the center line of the shaft 112, this will create a pumping action to pull the oil through. The oil could then drain back into the cassette 220 to be recirculated again.

An oil cooled motor 110 will allow for a much higher continuous performance level compared to a water cooled electric motor. This is due to the fact that the oil coolant is applied directly to the hot parts of the electric machine, i.e. the copper end-turns in the stator and onto the rotor assembly to cool the magnets.

It should be mentioned that the improved concept is by no means limited to the embodiments described herein, and several modifications are feasible without departing from the scope of the appended claims.

The invention claimed is:

1. A hybrid drive module, comprising a housing formed by an end section of an engine block of an associated internal combustion engine, an ear structure attached to the end section and extending outwards from the engine block, and a cassette sealing the housing, the ear structure being arranged at a vertical position slightly above the lowermost point of a circular area of the end section, wherein the housing encloses a chain drive comprising a chain, the chain drive connecting an electrical motor with a crank shaft of the associated internal combustion engine via at least one coupling, wherein said housing further comprises a reservoir formed by an insert arranged within the ear structure and being provided around and behind a first sprocket of the chain drive, said first sprocket being driven directly by the electrical motor, the reservoir having an inlet for receiving oil from the chain during operation, and an outlet for distributing oil back to the chain.

2. The hybrid drive module according to claim 1, wherein the outlet is configured to distribute oil back to the chain when the oil level inside the reservoir reaches the vertical position of the outlet.

3. The hybrid drive module according to claim 1, wherein said reservoir inlet is arranged at an upper end of said first sprocket.

4. The hybrid drive module according to claim 1, wherein said reservoir outlet is arranged vertically below the reservoir inlet.

5. The hybrid drive module according to claim 3, wherein said reservoir outlet is arranged vertically below the reservoir inlet and is arranged at a vertical position at which the chain engages with the first sprocket.

6. The hybrid drive module according to claim 1, wherein said reservoir is provided with a magnet.

7. The hybrid drive module according to claim 1, wherein said at least one coupling comprises a dual mass flywheel or a disconnect clutch.

8. The hybrid drive module according to claim 1, further comprising a launch clutch arranged in series with a second sprocket of the chain drive, said second sprocket being directly connected with said at least one coupling.

9. The hybrid drive module according to claim 3, wherein said cassette is provided with at least one oil port extending from an exterior side of said cassette to an interior side of said cassette.

10. The hybrid drive module according to claim 3, wherein said cassette is provided with at least one oil port extending from an exterior side of said cassette to an interior side of said cassette, wherein said oil port of said cassette extends to a position at which the chain engages with the first sprocket.

11. The hybrid drive module according to claim 10, further comprising an oil pump configured to supply oil to said oil port of said cassette.

12. An engine assembly, comprising an internal combustion engine and a hybrid drive module, comprising a housing formed by an end section of an engine block of said internal combustion engine, and an ear structure extending out from said end section, and a cassette sealing the housing, the ear structure being arranged at a vertical position slightly above the lowermost point of a circular area of the end section, the housing enclosing a chain drive comprising a chain, the chain drive connecting an electrical motor with a crank shaft of the internal combustion engine via at least one coupling, wherein said housing further comprises a reservoir having an inlet for receiving oil from the chain during operation, and an outlet for distributing oil back to the chain.

13. The hybrid drive module according to claim 2, wherein said reservoir inlet is arranged at an upper end of said first sprocket.

14. The hybrid drive module according to claim 1, wherein said cassette is provided with at least one oil port extending from an exterior side of said cassette to an interior side of said cassette.

15. A hybrid drive module, comprising a housing formed by an end section of an engine block of an associated internal combustion engine, an ear structure attached to the end section and extending outwards from the engine block, and a cassette sealing the housing, the ear structure being arranged at a vertical position slightly above the lowermost point of a circular area of the end section, wherein the housing encloses a chain drive comprising a chain, the chain drive connecting an electrical motor with a crank shaft of the associated internal combustion engine via at least one coupling, wherein said housing further comprises a reservoir formed by an insert arranged within the ear structure and being provided around and behind a first sprocket of the chain drive, said first sprocket being driven directly by the electrical motor, the reservoir having an inlet for receiving oil from the chain during operation, and an outlet for distributing oil back to the chain.

\* \* \* \* \*